United States Patent [19]
Ong et al.

[11] Patent Number: 4,778,742
[45] Date of Patent: Oct. 18, 1988

[54] COLORED TONER COMPOSITIONS

[75] Inventors: Beng S. Ong, Mississauga; Walter Mychajlowskij, Georgetown; Lupu Alexandru, Toronto, all of Canada

[73] Assignee: Xerox Corporation, Stamford, Conn.

[21] Appl. No.: 105,621

[22] Filed: Oct. 7, 1987

[51] Int. Cl.$^4$ .......................... G03G 9/08; G03G 9/10
[52] U.S. Cl. ........................................ 430/106; 8/647; 528/183; 528/190; 528/290; 528/291; 528/370; 528/372; 430/110; 430/126
[58] Field of Search ............... 430/106; 8/647, 678, 8/679

[56] References Cited
U.S. PATENT DOCUMENTS

| | | | |
|---|---|---|---|
| 3,232,691 | 2/1966 | Wilhelm et al. | 8/1 |
| 3,549,304 | 12/1970 | Ebel et al. | 8/12 |
| 3,553,133 | 1/1971 | Olson | 430/106 |
| 4,101,269 | 7/1978 | Champenois | 8/4 |
| 4,144,252 | 3/1979 | Wang et al. | 8/647 X |
| 4,194,877 | 3/1980 | Peterson | 8/647 X |
| 4,645,727 | 2/1987 | Ong et al. | 430/106 |

FOREIGN PATENT DOCUMENTS

| | | | |
|---|---|---|---|
| 2047533 | 3/1971 | France | 430/106 |
| 54-24103 | 2/1979 | Japan | 8/647 |
| 59-64853 | 4/1984 | Japan | 430/106 |
| 1181287 | 2/1970 | United Kingdom | 430/106 |
| 1278262 | 6/1972 | United Kingdom | 8/647 |

Primary Examiner—Roland E. Martin
Attorney, Agent, or Firm—E. O. Palazzo

[57] ABSTRACT

A toner composition comprised of resin particles and polymeric dye components of the following formula:

[O—A——A—O—B]$_n$ wherein A is selected from the group consisting of alkylene and arylene; B is selected from the group consisting of

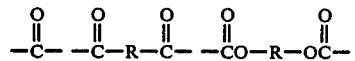

wherein R is selected from the group consisting of an alkylene group, an arylene group and a polyether group; and n represents a number of from 2 to about 100.

55 Claims, No Drawings

COLORED TONER COMPOSITIONS

BACKGROUND OF THE INVENTION

This invention is generally directed to toner compositions, and their use thereof in electrophotographic imaging systems. More specifically, the present invention is directed to the incorporation of colored polymeric dyes in toner and developer compositions where leaching or bleeding of the colorant is substantially eliminated. Without leaching there are enabled toner compositions that retain their color fidelity or intensity over extended time periods. Also, the dyed toner and developer compositions of the present invention are useful in various electrophotographic imaging systems, particularly colored imaging systems having incorporated therein as the photoconductive member a layered imaging device which is negatively or positively charged.

Toner and developer compositions including colored developer compositions are well known. These compositions usually contain toner particles consisting of a resin and colorants, and carrier particles. With regard to colored developer compositions, the colorants are usually selected from cyan dyes or pigments, magenta dyes or pigments, yellow dyes or pigments, and mixtures thereof. There are thus disclosed in U.S. Pat. No. 3,844,815 colored developer compositions containing as the yellow pigment Foron Yellow, while U.S. Pat. No. 4,035,310 discloses colored toner compositions comprised of pigment Yellow 97, and carrier particles generally comprised of steel coated with various polymeric resinous substances.

Also, it is known that one of the main advantages of selecting organic dyes instead of pigments for color toner compositions resides in the provisions of increased color fidelity as the dyes can be molecularly dispersed in the toner resins. To obtain a homogeneous dispersion, however, it is generally necessary to build into these molecules certain substituents for enhancing their compatibility with the toner resin. Unless the dye molecules are substantially fully compatible with the toner resins, they have a tendancy to aggregate with time, especially when subjected to heat, pressure and humidity thereby resulting in a loss of color fidelity. Additionally, the low molecular weight of the dye molecules causes a high lability or mobility of the dye molecules in the toner resin resulting in undesirable bleeding of the dyes.

Several prior art patents also disclose the incorporation into toner compositions, as separate components, charge enhancing additives, which additives may in an amount of from 0.1 to about 10 percent by weight be added to the compositions of the present invention, primarily for the purpose of imparting a positive charge to the toner resin particles. There is thus disclosed in U.S. Pat. No. 4,298,672, the disclosure of which is totally incorporated herein by reference, positively charged toner compositions containing resin particles and pigment particles, and as a charge enhancing additive alkyl pyridinium compounds and their hydrates of the formula as detailed in column 3, beginning at line 14. Examples of alkyl pyridinium compounds disclosed include cetyl pyridinium chloride. Moreover, there is disclosed in U.S. Pat. No. 4,338,390, the disclosure of which is totally incorporated herein by reference, positively charged toner compositions having incorporated therein as charge enhancing additives various organic sulfate and sulfonate compositions, including stearyl dimethyl phenylethyl ammonium paratoluene sulfonate. Further, in U.S. Pat. No. 3,893,935 there is described the use of quaternary ammonium salts as charge control agents for electrostatic toner compositions.

Additionally, there are disclosed in the prior art colored toner and developer compositions containing as charge enhancing additives para-halophenylcarboxylic acids, and the salts thereof. More specifically, there are disclosed in the prior art negatively charged toner compositions containing resin particles; dye particles such as cyan, magenta, or yellow dyes; and as a charge enhancing additive in an amount of from about 0.1 percent by weight to about 10 percent by weight parahalophenylcarboxylic acids, and the salts thereof, including 4-fluorobenzoic acid, 4-chlorobenzoic acid, and 4-bromobenzoic acid. The aforementioned additives may also be incorporated into the toner compositions of the present invention.

Other prior art includes U.S. Pat. No. 3,699,135, which discloses polymeric dyes prepared by the copolymerization of a specific silane with a derivative of an anthraquinone containing two aliphatic hydroxy groups; and U.S. Pat. Nos. 3,232,691; 3,549,304 and 4,101,269. These references disclose that the functional group formed on the chromophore enters into the polymerization reaction with the monomer leaving the chromophore as a pendant moiety in the polymer structure. Of background interest, there were selected as representative prior art U.S. Pat. Nos. 3,027,362; 3,117,957; 3,337,288; 3,344,098; 3,462,388; 3,467,642; 3,639,243; 4,070,296; 4,375,357; 4,568,624; 3,553,133; 3,852,208; 4,051,183; 4,194,877; 4,217,406; 4,339,237 and 4,397,651.

In addition, there are illustrated in U.S. Pat. No. 4,645,727, the disclosure of which is totally incorporated herein by reference, toner compositions comprised of resin particles with covalently bonded polymeric dye chromophores, which resins are of the formula as recited in claim 1. More specifically, this patent discloses and claims toner and developer resins containing covalently bonded dye chromophores of the following formula

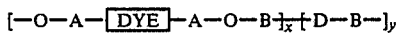

wherein A is selected from the group consisting of alkylene and arylene; B is selected from the group consisting of

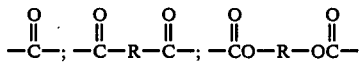

wherein R is an alkylene group, an arylene or polyether segment; D is selected from the group consisting of dioxyalkane or dioxyarene; x is a fraction number of from 0.01 to 0.50; and y is a fraction number of from 0.50 to 0.99, the sum of x+y being equal to 1. In contrast, there are selected for the colorants of the present invention polymeric dyes where, for example, there are absent any D-B segments. Also, with the toners of the present invention there can be selected lesser amounts of the polymeric dye while enabling a color intensity equal to or greater than the colored toners of the U.S. Pat. No. 4,645,727. There are also disclosed in this patent toner and developer compositions wherein the resins can be selected as colorants in conjunction with suitable resin hosts, reference the disclosure in column 12, lines 49 to 58. However, these resins are structurally complex, their syntheses complicated, and difficult to control. In addition, the terpolymeric nature and the high molecular weights of the color resins of the U.S. Pat. No. 4,645,727 could limit the number of the compatible host resins that may be utilized. In contrast, the polymeric dyes of the present invention, which are selected solely as colorants, are of a lower molecular weight; and they can be synthesized easily, and in relatively short time periods.

Although the above-described toner and developer compositions are suitable for their intended purposes, there continues to be a need for new compositions. Specifically, there is a need for colored toner compositions wherein dye aggregation and dye bleeding are eliminated. Also, there is a need for colored toner compositions which retain their color intensity for extended time periods. There is also a specific need for colored toner compositions wherein the colorants exhibit no tendency to leach, bleed, or sublime. Further, there remains a need for colored toner compositions wherein the colorants selected are uniformly dispersed thus imparting greater clarity and brightness to the resultant electrophotographic prints. Additionally, there is a need for toner compositions wherein the colorants selected permit high color quality and excellent color fidelity.

SUMMARY OF THE INVENTION

It is therefore an object of the present invention to provide colored toner and developer with the above noted advantages.

It is a further object of the present invention to provide colored toner and developer compositions with polymeric dyes.

In another object of the present invention there are provided colored toner and developer compositions, which resist dye bleeding and aggregation, and which retain their color fidelity over extended time periods.

A further object of the present invention is to provide processes for the synthesis of the aforementioned polymeric colorants.

In still a further object of the present invention there are provided colored toner compositions with polymeric colorants, which compositions are useful in color imaging systems wherein electrostatic images are separately formed on various imaging members, followed by sequential development with developer compositions containing the polymeric colorants of the present invention, followed by the transfer of the developed images to suitable substrates, and optionally permanently affixing thereon.

Another object of the present invention resides in the provision of color toner and developer compositions with polymeric colorants which can be prepared by simple reaction schemes in most instances.

A further object is to provide novel, high quality toner and developer compositions, which can readily be formulated, and manufactured using polymeric colorants of the present invention.

These and other objects of the present invention are accomplished by providing toner and developer compositions comprised of host resins and polymeric colorants of the following formula

wherein A is selected from the group consisting of alkylene and arylene; B is selected from the group consisting of

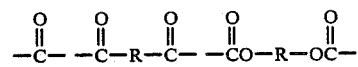

wherein R is an alkylene group, an arylene or polyether segment; and n represents the number of repeating segments, that is a number of from about 2 to about 100, and preferably from about 5 to about 35. The number average molecular weights of the aforementioned polymeric dyes are generally from about 500 to about 50,000, and preferably from about 2,000 to about 15,000.

As alkylene substituents, there can be selected alkylene groups of from 1 to about 6 carbon atoms inclusive of methylene, ethylene, propylene, and butylene. Arylene substituents include those containing from about 6 carbon atoms to about 24 carbon atoms, such as phenylene, and the various derivatives thereof.

Other alkylene and arylene groups that may be present include tetramethylene, pentamethylene, hexamethylene, and the like; tolylene, benzylene, biphenylene, and the like. Alkarylene groups may also be selected such as xylene, phenylene diethylene, phenylene-1,3-propylene, 4,4′-biphenylene dimethylene, and the like. Polyether segments include diethylene ether, dipropylene ether, triethylene ether, tetraethylene ether, and the like.

More specifically, with reference to the aforementioned polymeric colorants specific illustrative examples of the A substituents include

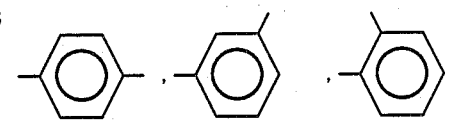

(i) para-phenylene (ii) meta-phenylene (iii) ortho-phenylene,

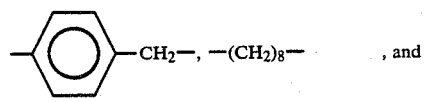

(iv) para-benzylene  (v) 1,8-octamethylene

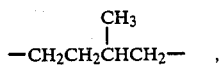

(vi) 3-methyl-1,4-butylene

Examples of the dye chromophores, DYE, are illustrated with reference to the following general formulas:

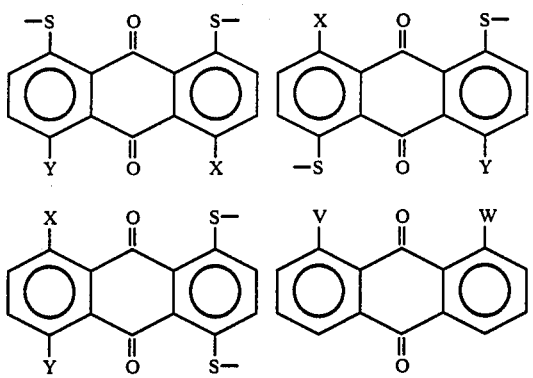
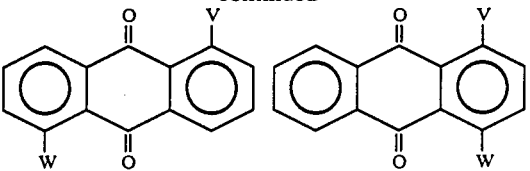

wherein X and Y are independently selected from the following groups: $SC_6H_5$; $SCH_3$; $SC_2H_5$; and H; V and W are independently selected from the following groups: $NH(CH_2)_z$—; $NHC_6H_4$—; $NH(CH_2)_zC_6H_4$—; and $NHC_6H_4(CH_2)_z$— wherein z is a number of from zero (0) to about 20.

Specific illustrative examples of polymeric colorant compositions of the present invention wherein the substituents are as defined herein include:

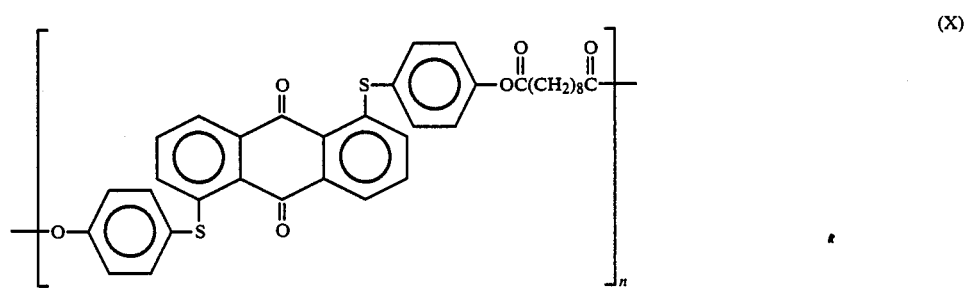

YELLOW POLYESTER DYE (X)

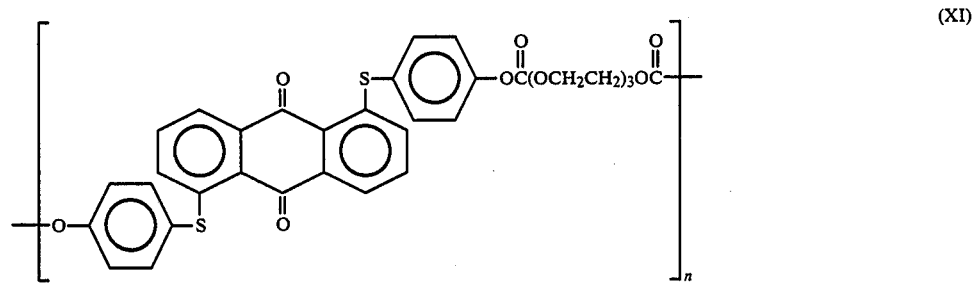

YELLOW POLYCARBONATE DYE (XI)

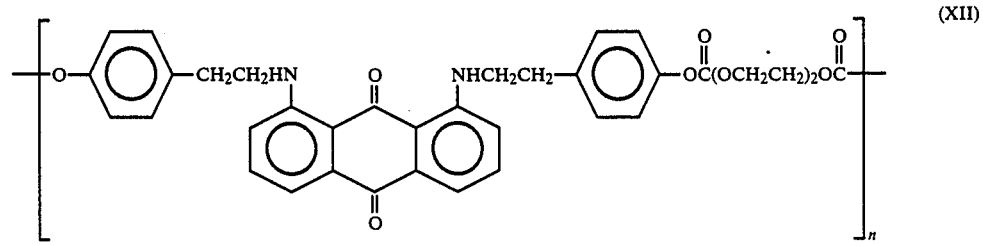

RED POLYCARBONATE DYE (XII)

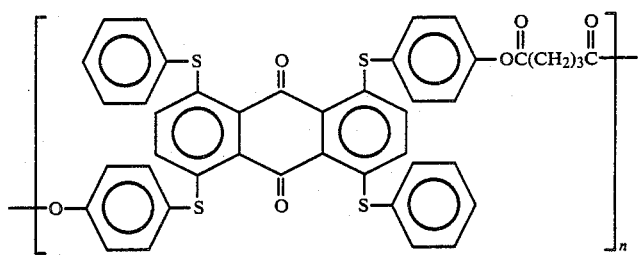

RED POLYESTER DYE (XIII)

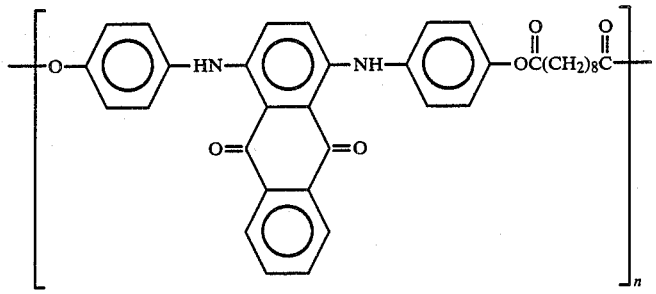

BLUE POLYESTER DYE (XIV)

and

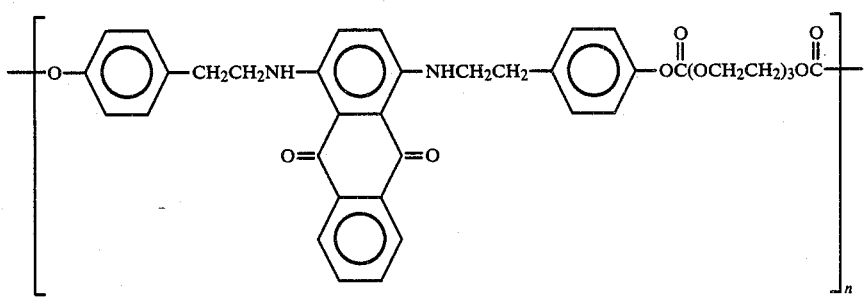

BLUE POLYCARBONATE DYE (XV)

The aforementioned polymeric colorants can be prepared by solution, and interfacial polymerization processes, reference for example the reaction schemes illustrated herein. In solution polymerization, stoichiometric amounts of appropriate monomers are reacted in a suitable solvent medium such as aliphatic halogenated hydrocarbons including methylene chloride in the presence of an excess amount of a tertiary amine such as triethylamine base. Polymerization is then affected at a temperature of from about 5° C. to about 30° C., and completed in about 0.5 to 3 hours. With interfacial polymerization, a bisphenoxy-functionalized dye is initially dissolved in an aqueous alkaline solution in the presence of an emulsifying agent. Thereafter, the resulting solution is stirred and treated with a solution of an appropriate bifunctionalized reagent, such as a diacyl chloride or bischloroformate in a water immiscible solvent such as methylene chloride to obtain, respectively, the polyester dye or the polycarbonate dye. The polymeric dyes from the solution polymerization process are then further treated by washing the reaction mixture with water, followed by precipitation of a methylene chloride solution of the dyes from a nonsolvent such as hexane or methanol. Also, with interfacial process, the polymeric colorants are separated by simple filtration, followed by washing thoroughly with water.

SCHEME 1: SOLUTION POLYCONDENSATION PROCESS

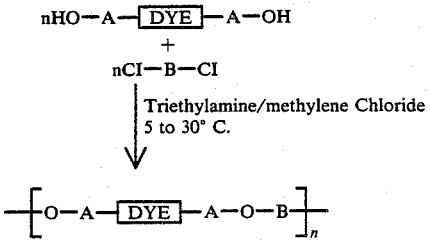

where as illustrative herein B is selected from the group consisting of

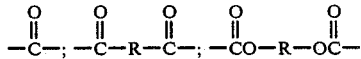

R is selected from the group consisting of an alkylene group, an arylene group, and a polyether group; and n represents the number of repeating units; and the other substituents are as described hereinbefore.

SCHEME 2:
INTERFACIAL POLYCONDENSATION PROCESS

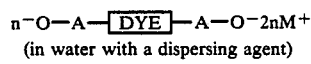
(in water with a dispersing agent)

+

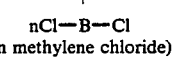
(in methylene chloride)

↓ 25° C.

where M+ is potassium or sodium cation; and A, B, and n are as described herein.

Examples of specific bisphenoxy-functionalized dyes selected as reactants include:

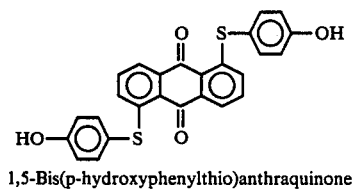

1,5-Bis(p-hydroxyphenylthio)anthraquinone  (I)

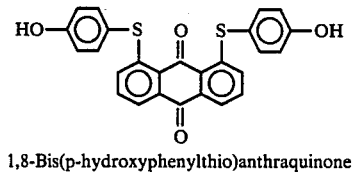

1,8-Bis(p-hydroxyphenylthio)anthraquinone  (II)

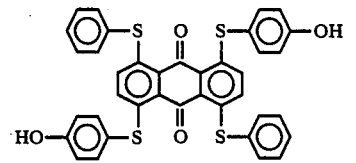

1,5-Bis(p-hydroxyphenylthio)-4,8-bis(phenylthio)anthraquinone  (III)

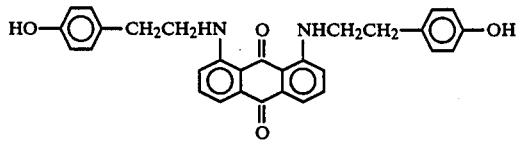

1,8-Bis[2-(p-hydroxyphenyl)ethylamino]anthraquinone  (IV)

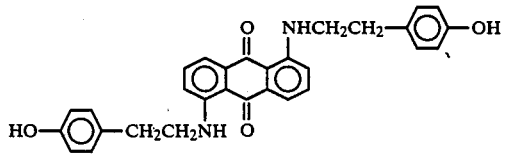

1,5-Bis[2-(p-hydroxyphenyl)ethylamino]anthraquinone  (V)

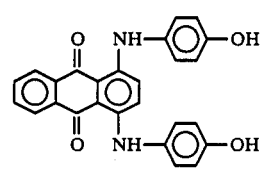

1,4-Bis(p-hydroxyphenylamino)anthraquinone  (VI)

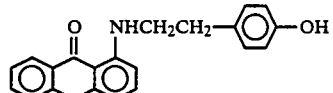

1,4-Bis[2-(p-hydroxyphenyl)ethylamino]anthraquinone  (VII)

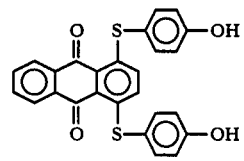

1,4-Bis(p-hydroxyphenylthio)anthraquinone  (VIII)

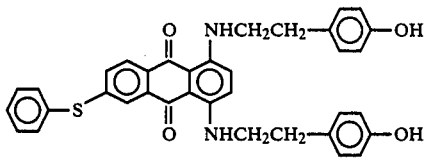

6-Phenylthio-1,4-bis[2-(p-hydroxyphenyl)ethylamino]anthraquinone  (IX)

Examples of diacyl halide reactants include succinyl chloride, glutaryl chloride, adipoyl chloride, dimethylglutaryl chloride, sebacoyl chloride, phthaloyl chloride, isophthaloyl chloride, terephthaloyl chloride, and the like. Illustrative examples of bishaloformates selected include ethyleneglycol bischloroformate, diethyleneglycol bischloroformate, triethyleneglycol bischloroformate, tetraethyleneglycol bischloroformate, biphenoxy bischloroformate, propylene-glycol bischloroformate, dipropyleneglycol bischloroformate, butyleneglycol bischloroformate, ethyleneglycol bisbromoformate, propyleneglycol bisbromoformate, and the like.

More specifically, with regard to the preparation by a solution polycondensation process, the functionalized dye is dissolved in a suitable organic solvent such as methylene chloride in the presence of an organic base such as pyridine at room temperature with the molar ration of the base to dye being from 2 to 10, and preferably from 2 to 4. Therefore, for each mole of the functionalized dye, about 2 to about 4 moles of pyridine are used. Further, the concentration of the functionalized dye is approximately 5 to 25 percent (w/v). Thereafter, the solution resulting is mechanically stirred and cooled by means of an ice bath to slightly below 10° C., and 1.0 mole of freshly distilled diacyl halide (for polyester dyes) or bishaloformate (for polycarbonate dyes) is then added dropwise over a period of 5 to 30 minutes, while the reaction temperature is maintained at below 15° C. during addition. After addition, the ice bath is removed, and the reaction mixture is further stirred at room temperature for another 1 to 5 hours to complete the polymerization. The reaction mixture is then diluted with solvent, and the resulting solution is washed several times with water to remove, for example, pyridinium halide and excess pyridine. Subsequently, the organic phase is separated, dried with magnesium sulfate, filtered and concentrated to about half of its original volume. The resultant polymeric dye can then be precipitated by pouring the above organic solution into a swirling methanol or hexane. Thereafter, the precipitated polymer product is filtered, washed thoroughly with methanol or hexane, and dried in vacuo.

For the interfacial process, the functionalized dye is first dissolved in an aqueous alkaline base solution such as potassium or sodium hydroxide solution. Subsequently, the solution resulting is stirred vigorously at room temperature in the presence of a dispersing agent such as sodium lauryl sulfate typically in an amount ranging from 0.5 to 10 percent by weight of the dye. To the solution is then added dropwise a solution of a bifunctional coupling agent such as diacyl chloride for the polyester dye synthesis, or bishaloformate for the polycarbonate dye synthesis, in methylene chloride or ethyl acetate. After the reaction, generally completed in about 10 to 60 minutes, the precipitated polymeric colorant is filtered, washed with water, and dried in vacuo for 12 hours.

Illustrative examples or resins within which the polymeric colorants illustrated herein are dispersed include, for example, polycarbonates, vinyl polymers, polyesters, epoxies, phenolics, copolyesters, diolefins such as styrene butadienes with a styrene content in excess of 80 percent, for example, polystyrenes, and the like. Various suitable vinyl resins may be selected including homopolymers or copolymers of two or more vinyl monomers. Typical vinyl monomeric units are styrene, p-chlorostyrene, vinyl naphthalene; unsaturated monoolefins such as ethylene, propylene, butylene, isobutylene, and the like; diolefins such as 1,3-butadiene, isoprene, and the like; vinyl halides such as vinyl chloride, vinyl bromide, vinyl fluoride; vinyl esters inclusive of vinyl acetate, vinyl propionate, vinyl benzoate, vinyl butyrate, and the like; esters of unsaturated monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalphachloroacrylate, methyl methacrylate, ethyl methacrylate, butyl methacrylate, and the like; acrylonitrile, methacrylonitrile, acrylamide, vinyl ethers, such as vinyl methyl ether, vinyl isobutyl ether, and vinyl ethyl ether; vinyl ketones like vinyl methyl ketone, vinyl hexyl ketone, and methyl isopropenyl ketone; vinylidene halides including vinylidene chloride, and vinylidene chlorofluoride; N-vinyl indole, N-vinyl pyrrolidone, and the like; and mixtures thereof.

As one preferred toner resin, there can be selected the esterification products of a dicarboxylic acid and a diol comprising a diphenol. These materials are illustrated in U.S. Pat. No. 3,655,374, the disclosure of which is totally incorporated herein by reference, the diphenol reactant being of the formula as shown in column 4, beginning at line 5, of this patent, and the dicarboxylic acid being of the formula as shown in column 6. Other preferred toner resins include styrene/methacrylate copolymers, and styrene/butadiene copolymers, available from Goodyear Chemicals as Pliolites; polyester resins obtained from the reaction of bisphenol A and propylene oxide; followed by the reaction of the resulting product with fumaric acid, and branched polyester resins resulting from the reaction of dimethylterephthalate, 1,3-butenediol, 1,2-propanediol, and pentaerythritol.

The above illustrated toner host resins are present, for example, in the toner composition in an amount of from about 70 percent by weight to about 99 percent by weight, and preferably in an amount of from about 80 percent by weight to about 98 percent by weight; while the polymeric colorants are present in an amount of from about 1 percent by weight to about 30 percent by weight, and preferably in an amount of from about 2 to 10 percent by weight.

Illustratives examples of carrier particles that can be selected for mixing with the aforementioned colored toner composition of the present invention include those substances that are capable of triboelectrically obtaining a charge of opposite polarity to that of the toner particles. Accordingly, the carrier particles of the present invention can be selected to be of a negative polarity causing the toner particles, which are positively charged, to adhere to and surround the carrier particles. Illustrative examples of carrier materials include granular zircon, granular silicon, polymethylmethacrylate, glass, steel, nickel, iron, ferrites, silicon dioxide, and the like. Additionally, there can be selected as carrier particles nickel berry carriers as disclosed in U.S. Pat. No. 3,847,604, the disclosure of which it totally incorporated herein by reference.

The selected carrier particles can be used with or without a coating, the coating generally comprising polyvinylidene resins, terpolymers of styrene, methylmethacrylate, and a silane such as triethoxy silane, reference U.S. Pat. Nos. 3,467,634 and 3,526,533, the disclosures of which are totally incorporated herein by reference; tetrafluoroethylenes, other fluorocarbon polymers; and the like.

Also, the diameter of the carrier particles can vary, however, generally these materials are from about 50 microns to about 1,000 microns in diameter enabling the carrier particles to possess sufficient density and inertia to avoid adherence to the electrostatic images during the development process. The carrier particles can be mixed with the toner particles in various suitable combinations, however, from about 1 part per toner to about 10 parts to about 200 parts by weight of carrier are mixed.

Further, the toner and developer compositions of the present invention, which may include therein charge enhancing additives, and other additives such as metal salts including zinc stearate and colloidal silica, reference U.S. Pat. Nos. 3,655,374 and 3,900,000, the disclosures of which are totally incorporated herein by reference, can be prepared by a number of known methods, including melt blending the dyed toner resin particles of the present invention followed by attrition. Other methods include those well known in the art such as spray drying, melt dispersion, extrusion, dispersion polymerization, and suspension polymerization.

Additionally, the toner and developer compositions of the present invention may be selected for developing images, particularly colored images, in electrophotographic imaging systems present on various suitable imaging surfaces capable of retaining charge such as those surfaces where a positive or negative charge resides on the photoreceptor selected. The imaging method comprises contacting the electrostatic latent image formed with the toner compositions of the present invention, followed by transferring the resulting image to a suitable substrate, and optionally permanently affixing the image by heat, or by exposure to solvent vapor. Examples of layered organic photoreceptors that can be selected as the imaging members include those comprised of transport layers and photogenerating layers, reference U.S. Pat. No. 4,265,990, the disclosure of which is totally incorporated herein by reference, and other similar layered photoresponsive devices. Useful photogenerating layers include those comprised of trigonal selenium, metal phthalocyanines, metal free phthalocyanines, vanadyl phthalocyanines, squaraine pigments, and azo pigments, while examples of charge transport layers encompass the diamines as disclosed in U.S. Pat. No. 4,265,990, hydrazones, and the like. A preferred photoconductive member useful with the developers of the present invention contains a supporting substrate such as aluminum; a photogenerating layer of trigonal selenium, about 75 to 80 percent by volume, dispersed in about 20 to 25 percent by volume of a polyvinylcarbazole resinous binder; and an amine transport layer with about 50 percent by weight of the amine molecule N,N-diphenyl-N,N-bis(3-methylphenyl) 1,1-biphenyl-4,4-diamine dispersed in a polycarbonate resinous binder, 50 percent by weight. Inorganic photoconductive imaging members can also be selected such as amorphous selenium, selenium alloys inclusive of selenium/arsenic, selenium/tellurium, selenium/arsenic/tellurium, and the like.

With further respect to the process illustrated herein, the functionalized bisphenolic dyes can be prepared by a number of different methods. In one process embodiment, for example, there are selected chlorinated anthraquinone precursors such as 1,5-dichloroanthraquinone; 1,8-dichloroanthraquinone; or 1,4-dichloroanthraquinone. This precursor is first dissolved in a suitable organic solvent such as dimethylformamide in the presence of a base such as potassium carbonate, followed by the addition of a hydroxyarenethiol. The molar ratio of the thiol to the chlorinated anthraquinone is from about 2.0 to about 2.25. Subsequently, the solution is mechanically stirred and heated to reflux for from 1 to about 24 hours. Thereafter, the reaction mixture is cooled, poured into water, and filtered. The solid product resulting is then washed with water and dried. Subsequently, the functionalized dye obtained is purified by recrystallization from an appropriate solvent such as acetic acid.

A second process involves reacting a chlorinated anthraquinone with an alkylaminophenol in a suitable organic solvent, such as o-dichlorobenzene, with the molar ratio of the aminophenol to chlorinated anthraquinone being 2.0 to 2.25. The mixture resulting is mechanically stirred and heated to 160° C. for from 8 to 24 hours. Subsequently, the reaction mixture is cooled to room temperature, and the product collected by filtration. The functionalized dye obtained is purified by recrystallization from an appropriate solvent such as isopropanol.

A third process comprises the treatment of a solution of chlorinated nitroanthraquinone such as 1,5-dichloro-4,8-dinitroanthraquinone in a suitable organic solvent such as dimethylformamide with an aryl thiol in the presence of a base such as potassium carbonate at room temperature, with the molar ratio of thiol to anthraquinone being 2.0. After about 3 hours at room temperature, a hydroxyarenethiol is added, and the reaction mixture is subsequently heated to reflux for from 1 to 4 hours. The molar ratio of the thiol to anthraquinone is 2.0 to 2.25. Subsequently, the reaction mixture is cooled to room temperature, and poured into water. The product resulting is filtered, washed with water and methanol, and dried to yield the desired bisphenolic dye.

In another process embodiment there is reacted a hydroxy anthraquinone such as quinizarine and leucoquinizarine with an alkylaminophenol in a suitable solvent such as pyridine. The molar ratio of the aminophenol to hydroxy anthraquinone is 2.0 to about 2.25. Subsequently, the reaction mixture is mechanically stirred, and heated to reflux for from 1 to about 24 hours. Subsequently, the mixture is cooled and poured into water, the resulting solid product is filtered, washed with water, and dried; followed by recrystallization from an appropriate solvent such as acetic acid to yield the pure bisphenolic dye.

The following examples are being submitted to further define embodiments of the present invention, it being noted that these examples are intended to illustrate and not to limit the scope of the present invention.

EXAMPLE I 1,5-Bis(p-Hydroxyphenylthio)Anthraquinone(I)

A mixture of 27.7 grams (0.1 mole) of 1,5-dichloroanthraquinone, 28.5 grams (0.22 mole) of p-hydroxythiophenol, 30 grams (0.22 mole) of potassium carbonate, and 200 milliliters of dimethyl formamide was heated with stirring at 145° C. for 4 hours. The mixture was then cooled to room temperature, and poured into 1.5 liters of water. Thereafter, the above product was isolated by filtration, washed with 500 milliliters of water, and air dried. The product was then recrystallized from acetic acid to yield 30 grams of 1,5-bis(p-hydroxyphenylthio)anthraquinone as a yellow powder, m.p. (melting point) 298° to 300° C.; ms 456 (M+); vis (DMF), $\lambda_{max}$ 450 nm (nanometers) ($\epsilon$ 6300); Analysis Calculated for $C_{26}H_{16}O_4S_2$: C, 68.4; H, 3.53; O, 14.02; S, 14.05. Found: C, 67.93; H, 3.60; O, 14.05; S, 14.26.

EXAMPLE II 1,5-Bis(p-Hydroxyphenylthio)-4,8-Bis(Phenylthio)Anthraquinone(III)

A mixture of 22 grams (0.2 mole) of benzenethiol, 25.6 grams (0.2 mole) of potassium carbonate in 100 milliliters of dimethyl formamide was heated with stirring to 120° C. for 2 hours. The cooled mixture was added to a cold mixture of 36.6 grams (0.1 mole) of 1,5-dichloro-4,8-dinitroanthraquinone in 150 milliliters of dimethyl formamide, and stirred for 3 hours at room temperature. After addition of 25.6 grams (0.2 mole) of p-hydroxybenzenethiol in 100 milliliters of dimethyl formamide, the mixture was stirred at 125° C. for 2 hours. The resulting reaction mixture was then cooled, and poured slowly into 2 liters of water. Subsequently, the above solid product III was filtered, washed once with water, acetic acid, methanol, respectively, and then dried in vacuo. The yield of this dye was 50 grams (75 percent), m.p. >340° C.; vis (DMF), $\lambda_{max}$ 540 nm ($\epsilon$ 12,000); Analysis Calculated for $C_{38}H_{24}O_4S_4$: C, 67.83; H, 3.59; O, 9.51; S, 19.06. Found: C, 67.51; H, 3.89; O, 9.35; S, 19.32.

EXAMPLE III 1,8-Bis[2-(p-Hydroxyphenyl)Ethylamino]Anthraquinone(IV)

A mixture of 27.7 grams (0.1 mole) of 1,8-dichloroanthraquinone, 30 grams (0.22 mole) of p-(2-aminoethyl)- phenol in 200 milliliters of o-dichlorobenzene was heated to 160° C. for 18 hours. The mixture was cooled to room temperature, and the product was collected by filtration. Thereafter, the aforementioned product was recrystallized from isopropanol to yield 29 grams (62 percent) of 1,8-bis[2-(p-hydroxyphenyl)ethylamino]anthraquinone as a red powder, m.p. 181° to 182° C.; vis (DMF), $\lambda_{max}$ 520 nm ($\epsilon$ 12,000); ms 478 (M+); Analysis Calculated for $C_{30}H_{26}N_2O_4$: C, 75.29; H, 5.48; N, 5.86; O, 13.38. Found: C, 74.94; H, 5.30; N, 5.63; O, 13.17.

EXAMPLE IV 1,4-Bis(p-Hydroxyphenylamino)Anthraquinone(VI)

A well-stirred mixture of 19.2 grams (0.08 mole) of quinizarine, 5.2 grams (0.02 mole) of leucoquinizarine, 30 grams (0.28 mole) of p-aminophenol, 1 gram of boric acid, and 150 milliliters of ethanol were heated under reflux for 72 hours. The resulting reaction mixture was then cooled to room temperature and filtered. Subsequently, the above product VI resulting was washed with ethanol and recrystallized from acetic acid. The yield of this blue dye was 30 grams (71 percent), m.p. 340° to 342° C.; ms 422 (M+); vis (DMF), $\lambda_{max}$ 639 nm ($\epsilon$ 15,000); Analysis Calculated for $C_{26}H_{18}N_2O_4$: C, 73.92; H, 4.29; N, 6.63; O, 15.15. Found: C, 73.50; H, 4.60; N, 6.45; O, 15.25.

EXAMPLE V 1,4-Bis[2-(p-Hydroxyphenyl)Ethylamino]Anthraquinone(VII)

A mixture of 21 grams (0.09 mole) of leucoquinizarine, 30 grams (0.22 mole) of p-(2-aminoethyl)phenol in 150 milliliters of pyridine was refluxed for 12 hours. The mixture was cooled to room temperature and poured into 2 liters of water. Thereafter, the product resulting was filtered, washed with water, and recrystillized from acetic acid to yield 26 grams, (60 percent) of 1,4-bis[2-(p-hydroxyphenyl)ethylamino]anthraquinone as a blue powder, m.p. 240° to 242° C.; vis (DMF), $\lambda_{max}$ 644 nm ($\epsilon$ 16,600); 598 nm ($\epsilon$ 14,100); ms 478 (M+); Analysis Calculated for $C_{30}H_{26}N_2O_4$: C, 75.29; H, 5.48; N, 5.86; O, 13.38. Found: C, 75.46; H, 5.32; N, 5.69; O, 13.26.

EXAMPLE VI

Polyester Yellow Dye (X)

A mixture of 0.020 mole of 1,5-bis(p-hydroxyphenylthio)anthraquinone obtained from Example I and 0.04 mole of sodium hydroxide was dissolved in 150 milliliters of water. To this mixture was added 1.5 gram of the dispersing agent sodium lauryl sulfate in 30 milliliters of water, and the resulting solution was mechanically stirred vigorously at room temperature. A solution of 0.022 mole of sebacoyl chloride in 80 milliliters of methylene chloride was then added, and the reaction mixture was stirred for 30 minutes before pouring into 3 liters of water. The solid polymer product was filtered, washed repeatedly with water to remove sodium chloride and the dispersing agent, and dried in vacuo. The yield of yellow polyester X was 81 percent, $M_n$ (number average molecular weight) 4,700 (relative to polystyrene standards); IR (neat), 1760 (s) cm$^{-1}$.

EXAMPLE VII

Polycarbonate Red Dye (XII)

To a solution of 0.063 mole of 1,8-bis[2-(p-hydroxyphenyl)ethylamino]anthraquinone obtained from Example III, and 35 milliliters of triethylamine in 300 milliliters of methylene chloride at 5° to 10° C. was added a solution of 0.065 mole of diethyleneglycol bischloroformate in 15 milliliters of methylene chloride. The addition was accomplished at a rate that the temperature of the reaction mixture remained below 15° C. The addition was completed in approximately 15 minutes. Subsequently, the mixture resulting was stirred at room temperature for 1.5 hours. Thereafter, the reaction mixture was washed several times with water and dried over anhydrous magnesium sulfate. The above product polymer XII was precipitated from the solution by pouring the latter into hexane with vigorous stirring. After filtration by suction, the solid product XII was washed with hexane and dried in vacuo. The yield was 87 percent, $M_n$, 12,400; IR (neat), 1775 (s) cm$^{-1}$.

EXAMPLE VIII

Polyester Red Dye (XIII)

A polyester red dye represented by formula XIII was synthesized in accordance with the procedure of Example VII with the exception of 0.063 mole of 1,5-bis(p-hydroxyphenylthio)-4,8-bis(phenylthio)anthraquinone and 0.065 mole of adipoyl chloride were employed, respectively, in place of 1,5-bis[p-hydroxyphenylthio]anthraquinone and sebacoyl chloride. The yield of polyester XIII was 76 percent; $M_n$, 7,150; IR (neat) 1760(s) cm$^{-1}$.

EXAMPLE IX

Polycarbonate Blue Dye (XV)

A polycarbonate blue dye represented by formula XV was synthesized in accordance with the procedure of Example VI with the exception that 0.060 mole of 1,4-bis[2-(p-hydroxyphenyl)ethylamino]anthraquinone and 0.063 mole of triethyleneglycol bischloroformate were selected, respectively, in place of 1,5-bis(p-hydroxyphenylthio)anthraquinone and sebacoyl chloride. The yield of polycarbonate blue dye XV was 87 percent; $M_n$, 7.300; IR (neat) 1775(s) cm$^{-1}$.

EXAMPLE X

Polyester Blue Dye (XIV)

A blue polyester dye represented by formula XIV was prepared in accordance with the procedure of Example VII with the exceptions that 0.060 mole of 1,4-bis(p-hydroxyphenylamino)anthraquinone was employed in place of 1,5-bis(p-hydroxyphenylthio)anthraquinone, and reaction completion was in 3 hours. The yield of polyester blue dye XIV was 79 percent; $M_n$, 10,700; IR (neat) 1760(s)cm$^{-1}$.

EXAMPLE XI

Polycarbonate Yellow Dye (XI)

A polycarbonate yellow dye represented by formula XI was synthesized by repeating the procedure of Example VII using 1,5-bis(p-hydroxyphenylthio)anthraquinone and triethyleneglycol bischloroformate instead of 1,8-bis[2-(p-hydroxyphenyl)ethylamino]anthraquinone and diethyleneglycol bischloroformate, respectively. The yield of polycarbonate yellow dye XI was 72 percent; $M_n$, 11,900; IR (neat) 1775 (s) cm$^{-1}$.

EXAMPLE XII

Blue Toner With Polycarbonate Blue Dye (XV):

A blue color toner comprising 9 percent by weight of the polycarbonate blue dye XV obtained from Example IX, 1 percent by weight of cetyl pyridinium chloride and 90 percent by weight of styrene-butydiene copolymer available from Goodyear Chemicals (Pliolites) was formulated by melt blending techniques, followed by attrition. The resulting toner with an average diameter size of 10 microns was mixed with 97 parts by weight of carrier particles comprised of a coating thereover of terpolymer of styrene, methacrylate, and an organo triethoxy silane. Thereafter, the aforementioned prepared developer was incorporated into a xerographic imaging test fixture containing a negatively charged layered photoconductive imaging member comprised of an aluminum supporting substrate, a photogenerating layer of trigonal selenium, and a hole transport layer thereover of N,N'-diphenyl-N,N'-bis(3-methyl phenyl) 1',1'-biphenyl-4,4'-diamine, 55 percent by weight dispersed in 45 percent by weight of Makrolon polycarbonate, reference U.S. Pat. No. 4,265,990, the disclosure of which is totally incorporated herein by reference; and there were obtained blue images of excellent resolution with no background deposits. The blue density of these images was about 20 percent higher than those obtained with an identical developer except that 9 percent by weight of the red polyester of formula XII of U.S. Pat. No. 4,645,727 was selected in place of the polycarbonate blue dye XV.

Other modifications of the present invention may occur to those skilled in the art subsequent to a review of the present application and these modification are intended to be included within the scope of the present invention. Thus, for example, colored xerographic images can be developed with the compositions of the present invention in accordance with the process described in U.S. Pat. No. 4,311,932, the disclosure of which is totally incorporated herein by reference.

What is claimed is:

1. A toner composition comprised of resin particles and polymeric dye components of the following formula:

wherein A is selected from the group consisting of alkylene and arylene; B is selected from the group consisting of

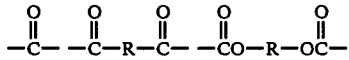

wherein R is selected from the group consisting of an alkylene group, an arylene group and a polyether group; and n represents a number of from 2 to about 100.

2. A toner composition in accordance with claim 1 wherein the alkylene group contains from 1 to about 20 carbon atoms.

3. A toner composition in accordance with claim 1 wherein the alkylene is methylene or ethylene.

4. A toner composition in accordance with claim 1 wherein the alkylene group contains from 2 to about 10 carbon atoms.

5. A toner composition in accordance with claim 1 wherein R is an alkylene group of from 1 to about 8 carbon atoms.

6. A toner composition in accordance with claim 1 wherein R is methylene.

7. A toner composition in accordance with claim 1 wherein the arylene is phenylene.

8. A toner composition in accordance with claim 1 wherein arylene is selected from the group consisting of para-phenylene, metaphenylene, ortho-phenylene, para-benzophenylene, and tolylene.

9. A toner composition in accordance with claim 1 wherein the B segment is —CO$_2$CH$_2$CH$_2$OCO—.

10. A toner composition in accordance with claim 1 wherein the B segment is —CO$_2$(CH$_2$CH$_2$O)$_2$CH—.

11. A toner composition in accordance with claim 1 wherein the B segment is —CO$_2$(CH$_2$CH$_2$O)$_3$CO—.

12. A toner composition in accordance with claim 1 wherein the B segment is —CO(CH$_2$)$_3$CO—.

13. A toner composition in accordance with claim 1 wherein the B segment is —CO(CH$_2$)$_4$CO—.

14. A toner composition in accordance with claim 1 wherein the B segment is —CO(CH$_2$)$_8$CO—.

15. A toner composition in accordance with claim 1 wherein the B segment is —CO$_2$CH$_2$OCO—.

16. A toner composition in accordance with claim 1 wherein the dye moiety DYE is selected from the group consisting of

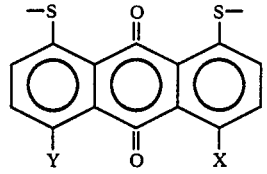

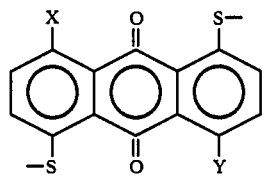

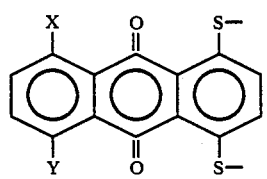

wherein X and Y are independently selected from the group consisting of SC$_6$H$_5$; SCH$_3$; SC$_2$H$_5$; and hydrogen.

17. A toner composition in accordance with claim 1 wherein the dye moiety DYE is selected from the group consisting of

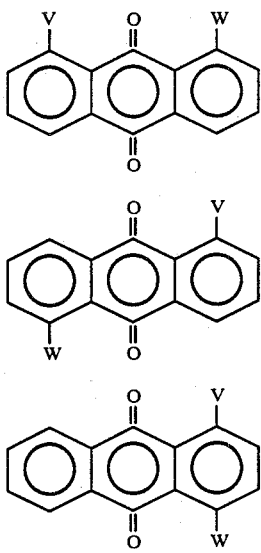

wherein V and W are independently selected from the group consisting of NH(CH$_2$)$_m$—; NHC$_6$H$_4$—; NH(CH$_2$)$_m$C$_6$H$_4$—; NHC$_6$H$_4$(CH$_2$)$_m$—, wherein m is a number of from zero (0) to about 20.

18. A toner composition in accordance with claim 1 wherein the resin particles are selected from styrene polymers.

19. A toner composition in accordance with claim 1 wherein the resin particles are selected from the group consisting of styrene acrylates, styrene methacrylates, styrene butadienes, and polyesters.

20. A toner composition in accordance with claim 1 wherein the resin particles are styrene butylmethacrylates.

21. A toner composition in accordance with claim 1 wherein the resin particles are comprised of styrene n-butylmethacrylate copolymers with a styrene content of at least 75 percent by weight.

22. A toner composition in accordance with claim 1 wherein the resin particles are comprised of styrene butadienes with from about 85 to about 95 percent by weight of styrene, and from about 5 to about 15 percent by weight of butadiene.

23. A toner composition in accordance with claim 1 wherein the resin particles contain therein charge enhancing additives.

24. A toner composition in accordance with claim 23 wherein the charge enhancing additive is cetyl pyridinium chloride.

25. A developer composition comprised of the toner composition of claim 1, and carrier particles.

26. A developer composition in accordance with claim 25 wherein the carrier particles contain a coating thereover.

27. A developer composition in accordance with claim 25 wherein the R segment for the polymeric dye of the toner is an alkylene group of from 1 to about 6 carbon atoms.

28. A developer composition in accordance with claim 25 wherein the arylene for the dyes is phenylene.

29. A developer composition in accordance with claim 28 wherein arylene is selected from the group consisting of para-phenylene, meta-phenylene, ortho-phenylene, para-benzophenylene, and octamethylene.

30. A developer composition in accordance with claim 23 wherein the B segment for the polymer dye is —CO$_2$CH$_2$CH$_2$OCO—.

31. A developer composition in accordance with claim 23 wherein the B segment for the polymer dye is —CO$_2$(CH$_2$CH$_2$O)$_2$CO—.

32. A developer composition in accordance with claim 23 wherein the B segment for the polymer dye is —CO$_2$(CH$_2$CH$_2$O)$_3$CO—.

33. A developer composition in accordance with claim 23 wherein the B segment for the polymer dye is —CO(CH$_2$)$_3$CO—.

34. A developer composition in accordance with claim 23 wherein the B segment for the polymer dye is —CO(CH$_2$)$_4$CO—.

35. A developer composition in accordance with claim 23 wherein the B segment for the polymer dye is —CO(CH$_2$)$_8$CO—.

36. A developer composition in accordance with claim 23 wherein the B segments for the polymeric dye is —CO—.

37. A developer composition in accordance with claim 23 wherein the dye chromophore for the toner is selected from the group consisting of

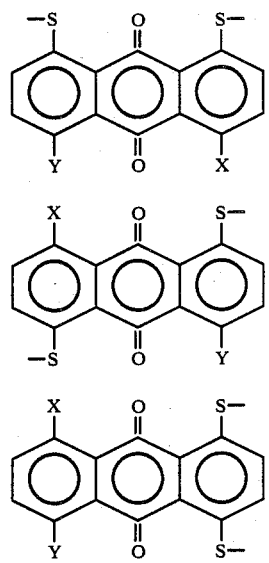

wherein X and Y are independently selected from SC$_6$H$_5$; SCH$_3$; SC$_2$H$_5$; and hydrogen.

38. A developer composition in accordance with claim 25 wherein the dye chromophore for the toner is selected from the group consisting of

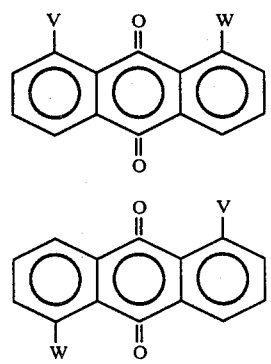

-continued

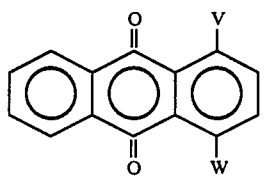

wherein V and W are independently selected from the group consisting of $NH(CH_2)_m-$; $NHC_6H_4-$; $NH(CH_2)_mC_6H_4-$; and $NHC_6H_4(CH_2)_m-$, wherein m is a number of from zero (0) to about 20.

39. A toner composition in accordance with claim 1 wherein polymeric dye is of formula X.

40. A toner composition in accordance with claim 1 wherein polymeric dye is of the formula XI.

41. A toner composition in accordance with claim 1 wherein the polymeric dye is of formula XII.

42. A toner composition in accordance with claim 1 wherein the polymer dye is of formula XIII.

43. A toner composition in accordance with claim 1 wherein the polymer dye is of formula XIV.

44. A toner composition in accordance with claim 1 wherein the polymer dye is of formula XV.

45. A method of imaging which comprises generating an electrostatic latent image on a photoresponsive imaging member, developing the image formed with the toner composition of claim 1, and subsequently transferring the image to a permanent substrate.

46. A method of imaging in accordance with claim 45 wherein the image is fixed to the substrate.

47. A method of imaging in accordance with claim 45 wherein the polymeric dye for the toner is of formula X.

48. A method of imaging in accordance with claim 45 wherein the polymeric dye for the toner is of the formula XI.

49. A method of imaging in accordance with claim 45 wherein the polymeric dye for the toner is of formula XII.

50. A method of imaging in accordance with claim 45 wherein the polymeric dye for the toner is of the formula XIII.

51. A method of imaging in accordance with claim 45 wherein the polymeric dye for the toner is of formula XIV.

52. A method of imaging in accordance with claim 45 wherein the polymeric dye for the toner is of the formula XV.

53. A toner composition in accordance with claim 1 wherein n is a number of from 5 to 35.

54. A toner composition in accordance with claim 1 wherein the number average molecular weight of polymeric dye is from about 500 to about 50,000.

55. A toner composition in accordance with claim 1 wherein the number average molecular weight of polymeric dye is from about 2,000 to about 15,000.

* * * * *